United States Patent [19]
Pearce et al.

[11] Patent Number: 5,769,595
[45] Date of Patent: Jun. 23, 1998

[54] SLIP SHEET HANDLING APPARATUS FOR PALLET JACKS

[75] Inventors: Ronald A. Pearce, Lakewood; Ira Daniel Hooker, Arvada, both of Colo.

[73] Assignee: Rapsco, Inc., Denver, Colo.

[21] Appl. No.: 571,267

[22] Filed: Dec. 12, 1995

[51] Int. Cl.$^6$ ........................................ B66F 9/06
[52] U.S. Cl. ........................................ 414/661; 414/607
[58] Field of Search ........................ 414/280, 497, 414/607, 608, 661, 785

[56] References Cited

U.S. PATENT DOCUMENTS

| | | | |
|---|---|---|---|
| 3,495,730 | 2/1970 | Rigsby | 414/497 X |
| 3,640,414 | 2/1972 | Brudi | 214/514 |
| 4,037,744 | 7/1977 | Nagin, Jr. et al. | 414/497 |
| 4,274,794 | 6/1981 | Olson | 414/661 X |
| 4,300,867 | 11/1981 | Frees | 414/661 X |
| 4,619,579 | 10/1986 | Frison | 414/607 |
| 4,708,575 | 11/1987 | Farmer et al. | 414/661 X |
| 4,828,450 | 5/1989 | Adamski et al. | 414/607 |
| 4,890,973 | 1/1990 | Frison et al. | 414/607 |
| 5,316,433 | 5/1994 | Chase | 414/607 |

FOREIGN PATENT DOCUMENTS

0120174  5/1990  Japan ........................ 414/661

*Primary Examiner*—James W. Keenan
*Attorney, Agent, or Firm*—John E. Reilly

[57] ABSTRACT

A slip sheet handling apparatus is specifically adaptable for retrofit attachment to a standard lift jack unit and is characterized by having a platen which is pivotally connected to the tines of the jack unit for tilting movement, and a gripper assembly is slidable along the platen to automatically cause upward and downward tilting movement of the platen as the gripper assembly is advanced into engagement with a slip sheet beneath a load and draws the slip sheet onto the platen in transporting the load from one site to another.

19 Claims, 8 Drawing Sheets

SLIP SHEET HANDLING APPARATUS FOR PALLET JACKS

BACKGROUND AND FIELD OF INVENTION

This invention relates to load handling apparatus; and more particularly relates to a novel and improved attachment for pallet jacks to facilitate loading and unloading of slip sheetsupported loads.

It has been customary practice in the past to place containerized loads on pallets so that a pallet jack or forklift truck of the type having narrow tines or forks can be employed for lifting, transporting and otherwise handling such loads. More recently, plastic slip sheets have been employed in place of pallets but have necessitated the use of specialized lifting and transporting devices.

It has been proposed in the past to equip the standard pallet jack or fork lift unit with a handling attachment and which is generally characterized by having a flatbed support surface or platen mounted in place of the tines or forks and a powered gripping mechanism which is able to grip a free edge of the slip sheet in order to draw the slip sheet and load onto the platen. Representative slip sheet handling devices are set forth and described in U.S. Pat. Nos. 4,828,450 to D. F. Adamski et al, 4,890,973 to E. C. Frison et al, 5,316,433 to D. F. Chase and 3,640,414 to Brudi.

In accordance with the present invention, it is proposed to greatly simplify the handling attachment unit and the manner of attachment to a standard pallet jack or fork lift truck and to greatly enhance its utility and efficiency in lifting, transporting and unloading slip sheet-supported loads. As employed herein, the term "lift jack" is understood to refer to and include any type of standard pallet jack or forklift truck unit having spaced tines.

SUMMARY OF THE INVENTION

It is an object of the present invention to provide for a novel and improved slip sheet handling unit which is specifically adaptable for use as a retrofit unit to be attached to existing pallet jack units.

Another object of the present invention is to provide for a slip sheet handling unit including a gripping assembly which can be closely controlled for advancement along a flatbed support surface for a load to be transported, and further wherein the unit is movable beyond the support surface into ground-engaging relation to a slip sheet to be grasped and is capable of automatically applying increased pressure to the edge of the slip sheet once grasped.

It is a further object of the present invention to provide in a slip sheet handling attachment for a flatbed support surface which is automatically tiltable to facilitate alignment with a load to be engaged and further tiltable upwardly from a ground-engaging position so that the load can be transported from one site to another.

A further object of the present invention is to provide in a slip sheet handling unit for a novel and improved gripper assembly incorporating a drive system for smoothly advancing and retracting the gripper assembly with respect to a flatbed support surface.

A still further object of the present invention is to provide in a slip sheet handling unit for a novel and improved remote control which will permit the operator to closely follow advancement and retraction of a gripper assembly in picking up and depositing a load.

In accordance with the present invention, a slip sheet handling apparatus has been devised for pallet jack of the type provided with spaced, horizontally extending tines, the apparatus being made up of a platen having means mounting the platen on the tines for tilting movement of the platen about a transverse horizontal axis beneath the platen whereby a forward end of the platen is movable between a raised position and a lowered ground-engaging position, and a gripper assembly mounted for horizontal advancement above the platen between a rearward and forward end of the platen, the gripper assembly including upper and lower jaws and control means for advancing the jaws between an open position to receive an edge of the slip sheet and a closed, slip sheet-engaging position.

In the preferred form of gripper assembly, the upper and lower jaws are defined by a pressure pad which is movable downwardly under the control of a linear actuator cooperating with a spanner to equalize the pressure across the pad in driving the pad downwardly into engagement with the lower jaw, and the lower jaw preferably takes the form of a flange which is fixed with respect to the pressure pad and has an upper shelf portion adapted to receive an edge of the slip sheet so that downward pressure of the pressure pad will firmly wedge the edge of the slip sheet between the pad and flange. The gripping pressure is further enhanced by mounting the pressure pad for suspension from swivel joints so that the pad is free to undergo limited rocking or pivotal movement along the shelf portion. Further, the gripper assembly is floatingly mounted with respect to a carriage which is slidably secured to the platen so that the assembly can ride along the upper surface of the platen and automatically drop below the platen when the gripper assembly is advanced beyond the leading edge of the platen.

The above and other objects of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Referring in more detail to the drawings there is shown by way of illustrative example in FIGS. 1 to 8 a preferred form of slip sheet handling attachment 10 mounted on a conventional jack unit J. The unit J is merely representative of various types of pallet jacks and forklift trucks employed in lifting and transporting loads and especially large, containerized loads. Thus, for the purpose of illustration but not limitation, the unit J is made up of a wheelbase B having groundengaging wheels W, handle H, closely spaced horizontally extending tines T which may be appropriately equipped with front rollers R, a pump P with foot control lever L, and a motor drive M to control advancement of the jack unit J. The spacing between tines T is such that the tines are capable of being advanced into the opening in one side or end of a pallet in a conventional manner so that the pallet and load rest upon the tines T and can be easily lifted and transported. Further, the unit J is typically provided with a control panel, not shown, conveniently located on or near the handle H for operator control of the motor drive M. One commercial version of the unit as described is manufactured and sold by Warn Industries, Inc. of Milwaukie, Oregon.

Figure 7:
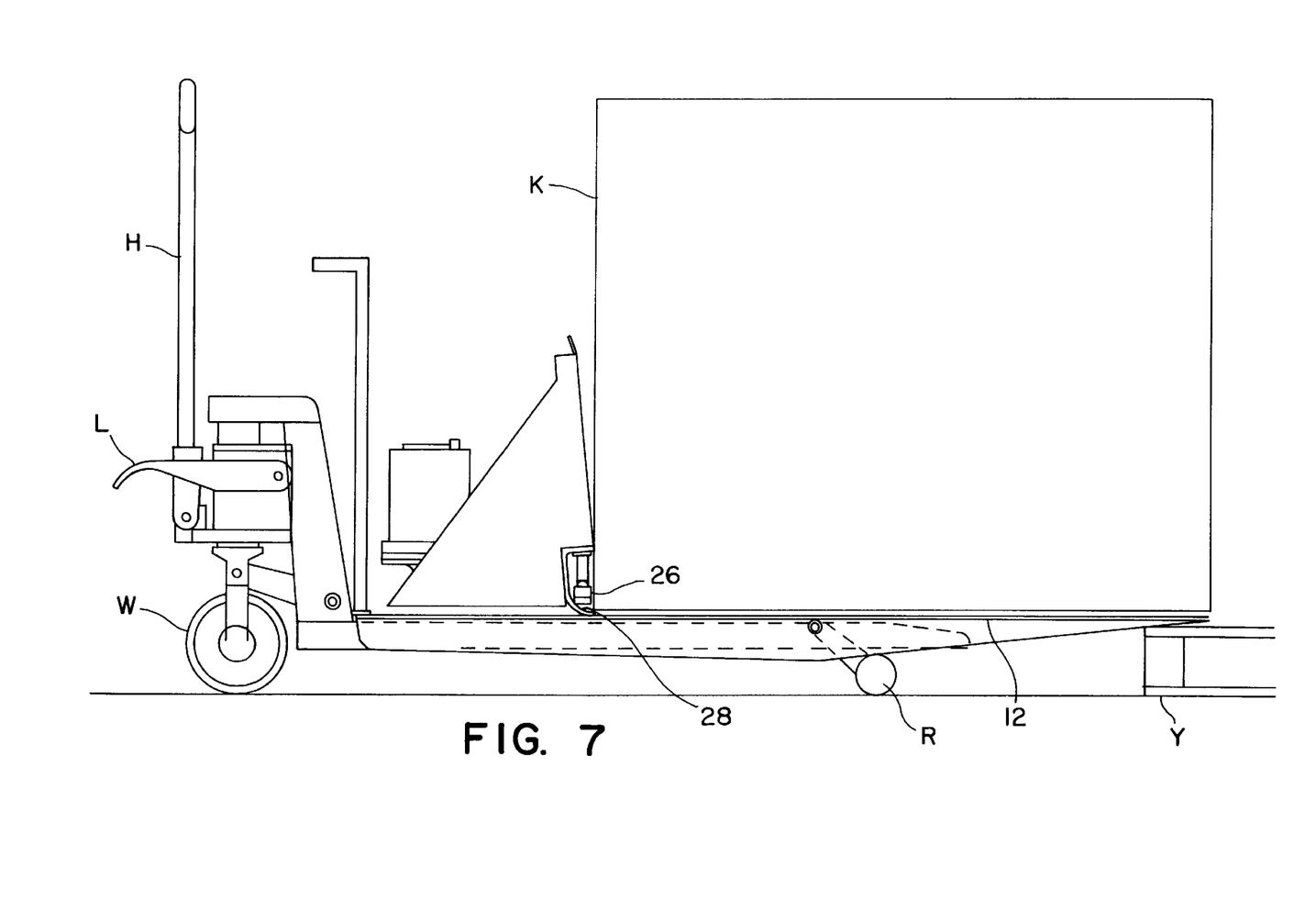
FIG. 7 is another somewhat schematic side view of the handling attachment of the present invention shown depositing a load upon a pallet.
Figure 8:
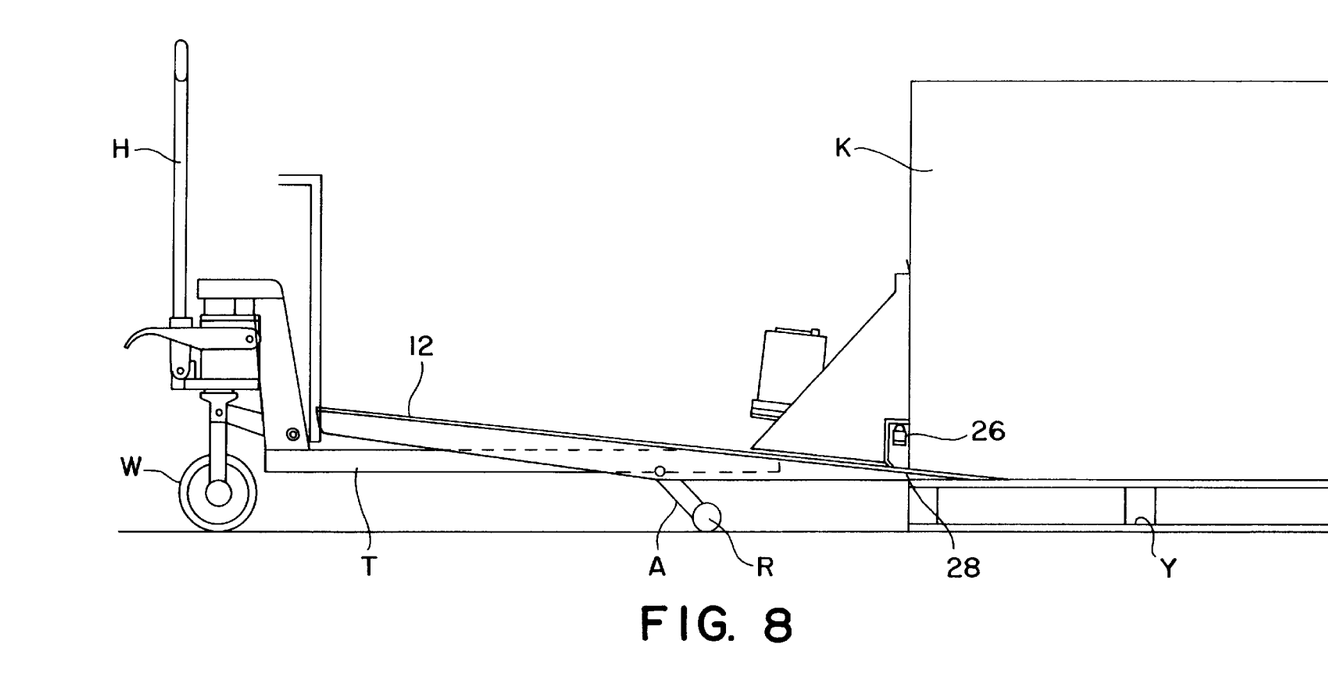
FIG. 8 is another schematic side view illustrating the completion of the unloading procedure onto a pallet.

The slip sheet handling attachment 10 of the present invention is characterized by its ability to be retrofit to the unit J for ease of interchangeable use of the unit J either as a standard pallet jack or as a jack for handling slip sheets. A slip sheet as represented at S is customarily placed beneath a containerized load K directly on a floor surface or on a pallet Y, for example, as illustrated in FIGS. 7 and 8. The typical slip sheet S is a rectangular, high strength plastic sheet which is oversized with respect to the load K so that an edge E of the slip sheet S projects beyond the load and can be grasped by the attachment 10 in a manner to be described. Accordingly, the attachment 10 is broadly comprised of a flatbed support surface or platen 12 which is dimensioned for extension over and beyond the tines T, and lower fulcrum-like support members 13 depend downwardly from the platen 12 so as to straddle the tines T and are pivotally connected to function as fulcrums for tiltable movement of the platen 12 about aligned transverse horizontal axes through the forward ends of the tines T. A gripper assembly 14 is mounted on a carriage 15 for horizontal advancement between a rearward end of the platen 12 adjacent to the wheel base B and a forward or free end of the platen 12 beyond the free ends of the tines T. This advancement is controlled by a chain drive 16 traversing the substantial length of the platen 12 between the rearward and forward ends and including a power transmission drive 18 on the gripper assembly 14.

Figure 3:
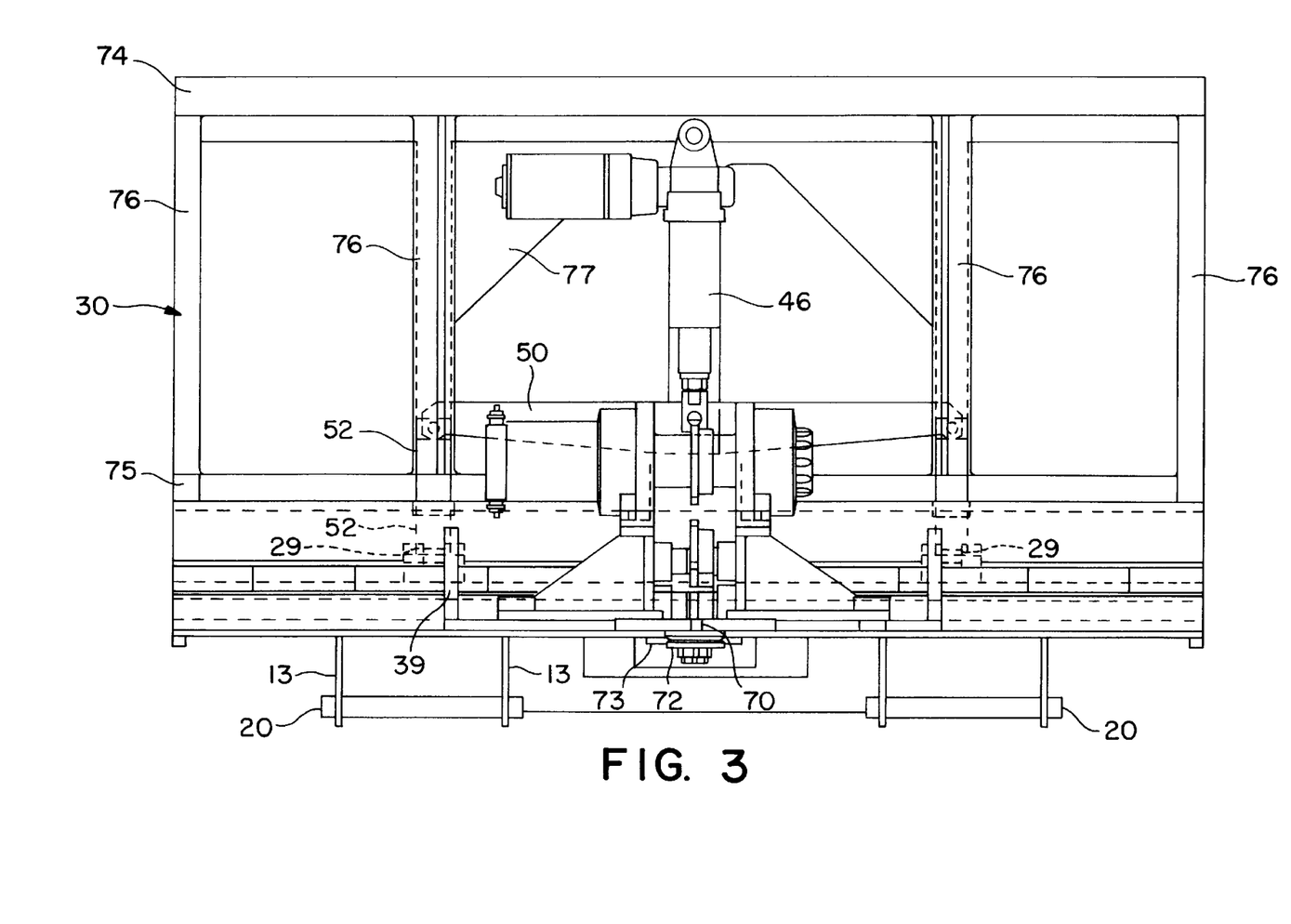
FIG. 3 is an enlarged rear view in tion of the gripper assembly forming a part of the slip sheet handling attachment of the present invention.
Figure 4:
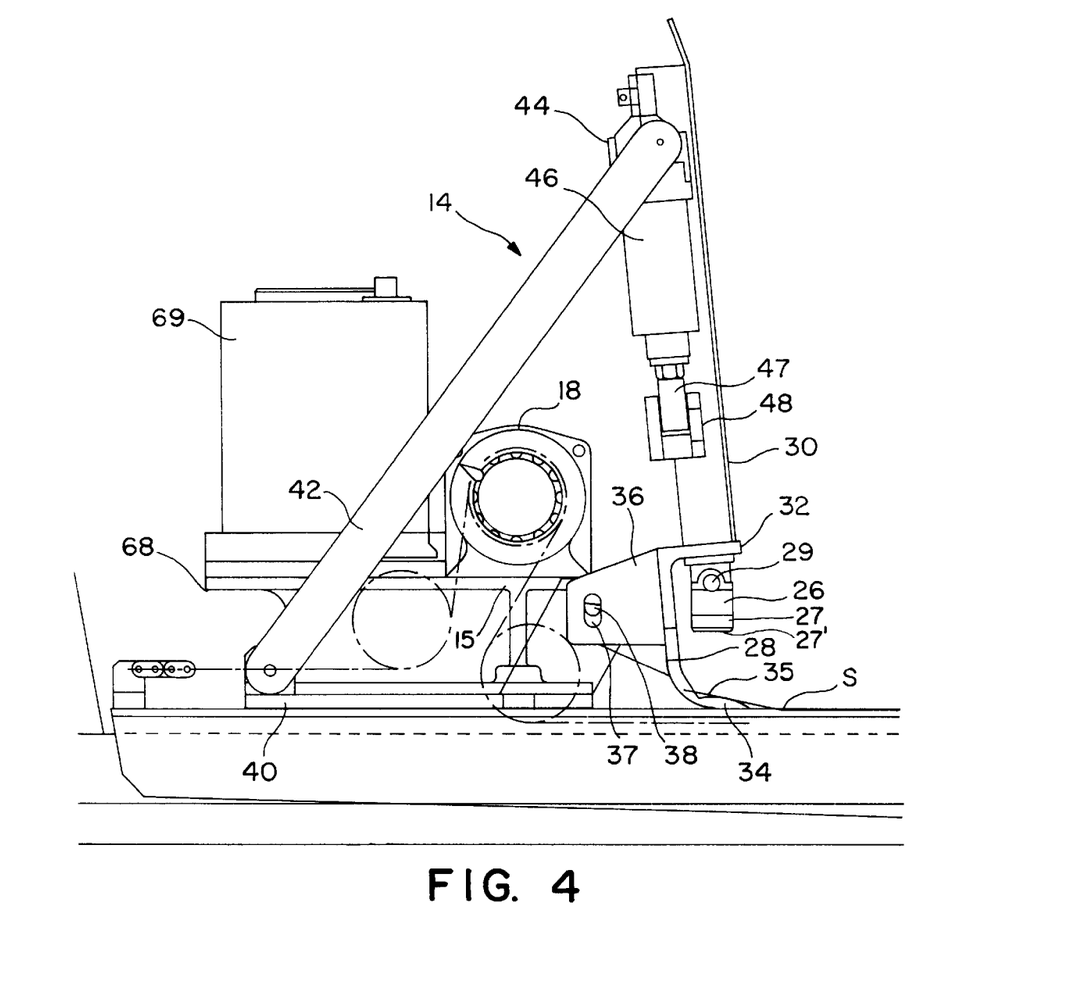
FIG. 4 is an enlarged side view of the gripper assembly shown in FIG. 3.
Figure 5:
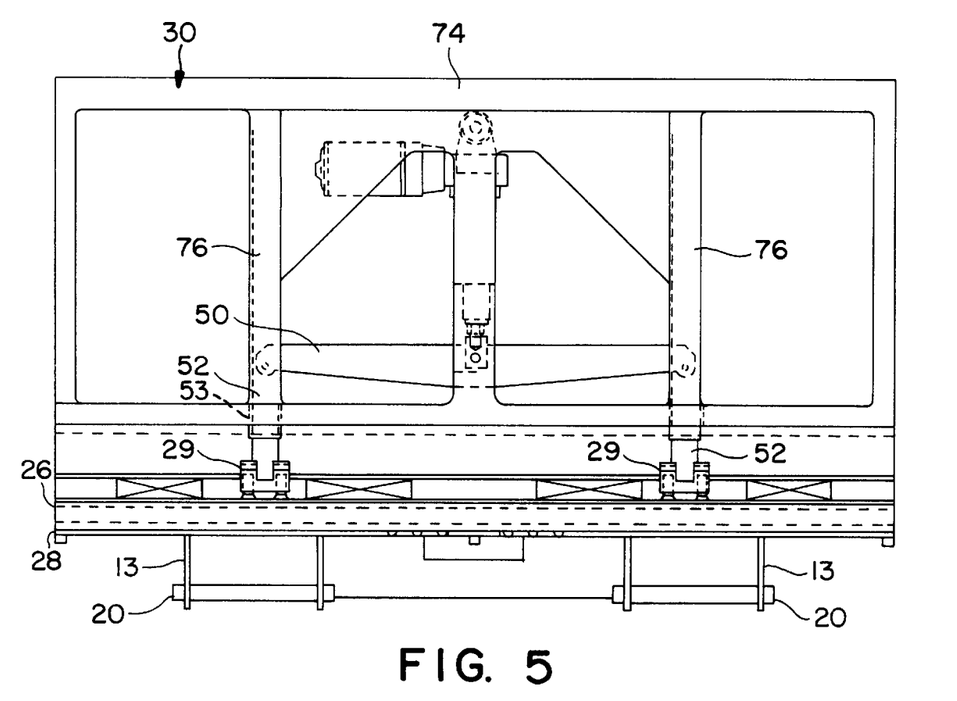
FIG. 5 is an enlarged front view in elevation of the gripper assembly shown in FIGS. 3 and 4.
Figure 6:
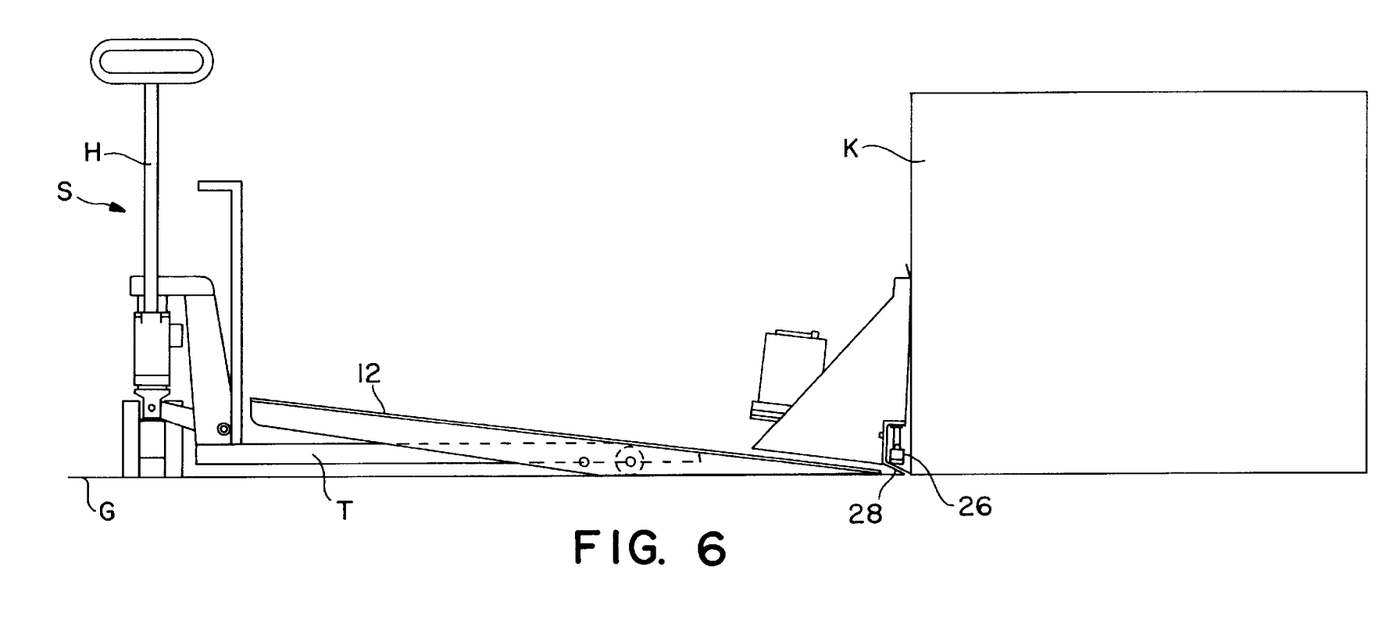
FIG. 6 is a somewhat schematic side view of the handling attachment of the present invention with the gripping assembly engaging a slip sheet beneath a load.

As best seen from FIGS. 3 and 5, a pair of fulcrum support members or stringers 13 flank opposite sides of each tine T, and the stringers 13 are pivotally connected to each tine T by a pivot pin 20 extending transversely through forward ends of the tines T. Each of the stringers 13 diverges forwardly or increases in depth toward a fulcrum point 22 and then taper forwardly as at 24 to terminate at the forward or leading edge 25 of the platen 12. For heavier loads, pivot pins can be inserted into openings 20' that are closer to the forward ends of the tines T than the pins 20 to better distribute the load on the platen. In this way, forward advancement of the gripper assembly 14 along the platen and beyond the fulcrum points 22 will cause the platen to automatically tilt about the pivot pins 20 to cause the leading edge 25 to advance into a ground-engaging position, for example, as illustrated in FIGS. 6 and 8.

Another important feature of the present invention resides in the gripper assembly 14 and the construction and arrangement of upper and lower jaws 26 and 28 at the forward end of the gripper assembly. The upper jaw 26 is preferably in the form of an elongated pressure pad having a metal bar 27 to which is affixed a strip 27' of rubber or rubber-like composition which traverses the entire width of the platen and is suspended from a pair of upper swivel joints 29 beneath a vertical push plate or frame 30. The lower jaw 28 is in the form of a rigid flange which is coextensive with the pressure pad 26 and includes an upper horizontal support 32 which is attached to the lower end of the frame 30. The jaw 28 extends downwardly from the support 32 behind the pressure pad 26 and curves forwardly into a lower beveled end 34, the beveled end having an upper horizontal shelf or notched portion 35 for a purpose to be described. A pair of laterally spaced brackets 36 are affixed to the rear vertical surface of the lower jaw 28 and are provided with vertically extending, closed slots 37 to receive pins 38 on spaced support arms 39 on the carriage 15.

The carriage 15 includes a horizontal base or skid 40 with diagonally extending link arms 42 inclining upwardly and forwardly from pivotal connection to support arms 43 at the rearward end of the skid 40 and pivotally connected at the upper end of the frame 30. Thus, the entire assembly 14 is free to undergo limited vertical floating movement by virtue of the slidable movement of the support pins 38 with respect to the slots 37. For instance, the weight of the lower jaw 28 is normally supported by the platen 12, but the lower jaw 28 along with the rest of the carriage assembly 14 will be free to slide downwardly when it is advanced beyond the leading edge 25 into ground-engaging disposition, as shown in FIGS. 6 and 8.

The upper jaw or pressure pad 26 is movable upwardly and downwardly with respect to the beveled end 34 of the lower jaw 28 under the control of a linear actuator 44 mounted behind the frame 30. The actuator 44 includes a motor-driven worm drive 46 having a lower end 47 pivotally connected as at 48 to the midpoint of a spanner arm 50 which extends horizontally across an open intermediate portion of the frame 30. A connecting rod 52 extends downwardly from pivotal connection to each of the opposite ends of spanner 50 through a hollow slotted guide 53 on the frame 30, the lower end of each connecting rod 52 being connected to one of the spaced swivel joints 29 for the pressure pad 26. The pressure pad 26 is normally suspended and spaced above the lower jaw 28 by the connecting rods 52 and is caused to move downwardly into engagement with the lower end 34 of the lower jaw 28 when the linear actuator 44 is activated to drive the spanner 50 downwardly; however, the pivotal mounting of the spanner will equalize the pressure of the pressure pad 26 against the lower jaw 28 so as to impart uniform pressure along the length of the lower jaw 28.

In order to advance the gripper assembly 14 and its carriage 15 along the platen 12, the chain 16 is disposed in an intermediate slot 60 traversing the substantial length of the platen 12, the chain being anchored at opposite ends 61 and 62. The rearward end of the chain 16 extends forwardly and is trained about an idler 64, looped over a sprocket drive 65 on a motor-driven winch and passed over a lower idler sprocket 66 and then into the slot 60. One suitable form of sprocket drive is the utility wedge manufactured by Warn Industries, Inc. of Milwaukie, Oregon, and which can be employed either as a chain drive or cable drive. The sprocket drive 65 together with the idler 64 and 66 make up the power transmission drive 18 for the chain and are mounted on a pedestal 68 above the base 40. The base 40 also supports a battery 69 which serves as a power source for the sprocket drive 65.

Figure 2:
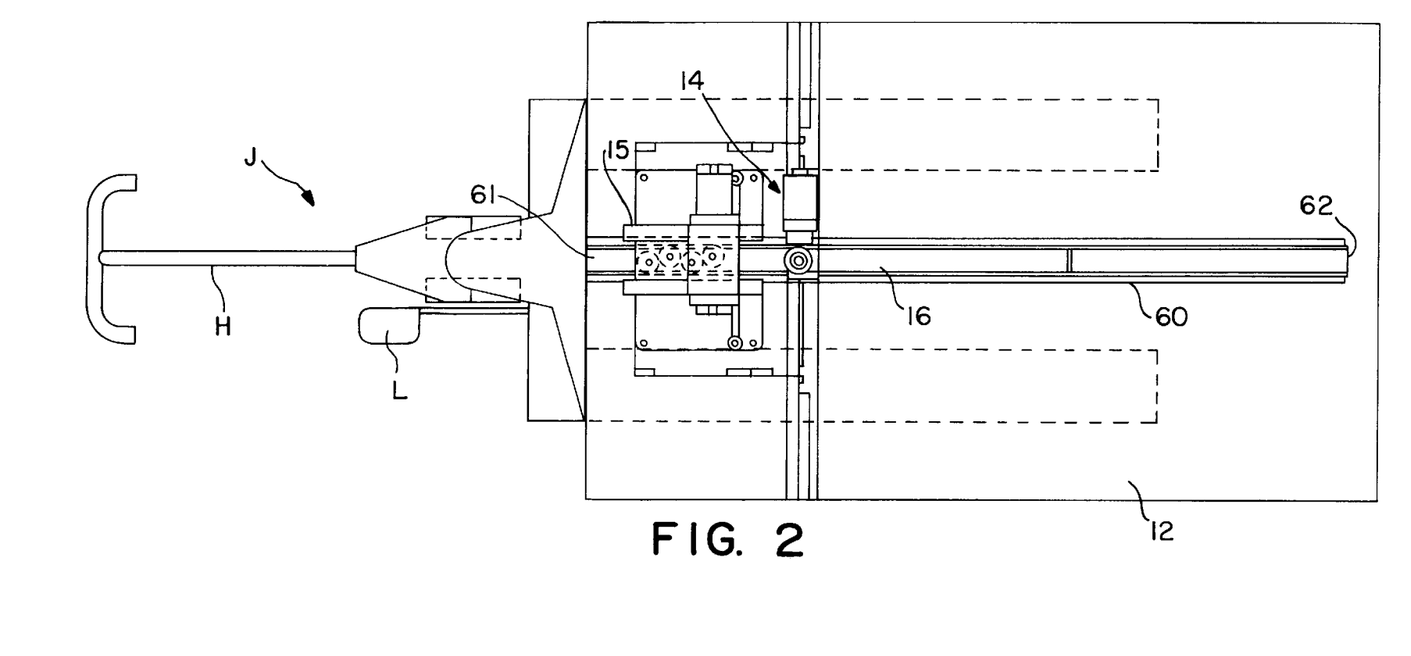
FIG. 2 is a top plan view of the preferred embodiment shown in FIG. 1.

In order to center the gripper assembly 14 with respect to the platen 12, the base 40 is guided along the platen 12 by centering pins 70 extending downwardly through the slot 60 into staggered or offset guide wheels 72 which are journaled with respect to the drive pins beneath the slot 60 and advance along a guide track 73 on the underside of the platen 12 as shown in FIGS. 2 and 3. The offset guide wheels 72 in cooperation with the guide track 73 not only serve to guide or center the carriage 15 with respect to the platen 12 but to prevent any tendency of the carriage 15 to tilt or fishtail when the gripper assembly 14 engages a slip sheet and a load is being drawn onto the platen. One commercial version of the guide means as described is the DUALVEE manufactured and sold by Bishop-Wisecarver Corporation of Pittsburg, Calif.

The frame 30 is of generally rectangular configuration, of rigid metal construction and comprised of upper and lower frame members 74 and 75 traversing the width of the platen and rigidly interconnected by horizontally spaced vertical braces 76 and an intermediate gusset plate 77 between a pair of the intermediate braces 76.

Figure 1:
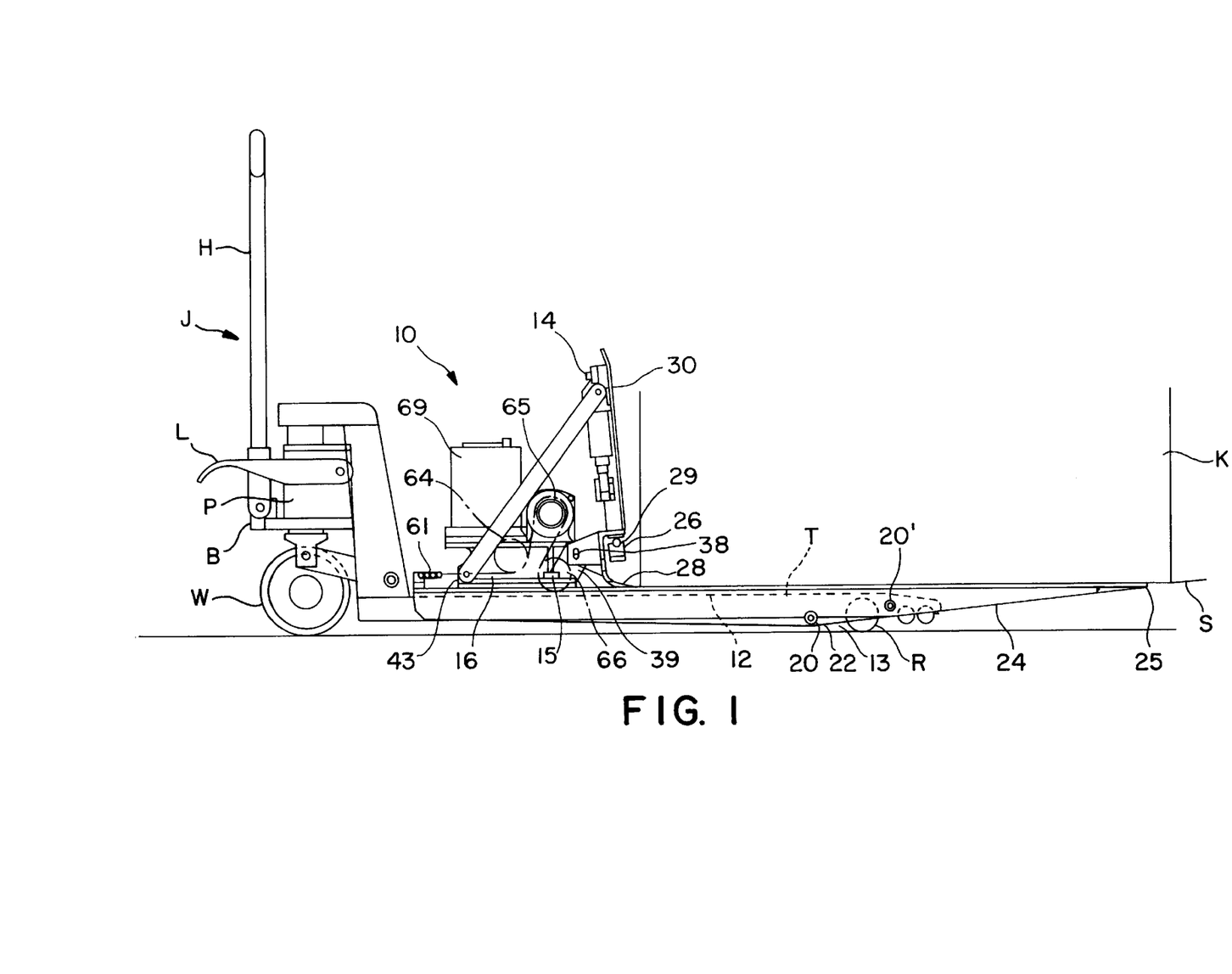
FIG. 1 is a side view in elevation of a preferred form of slip sheet handling attachment in accordance with the present invention in assembled relation to a standard pallet jack unit and illustrating a load supported on the attachment.
Figure 2A:
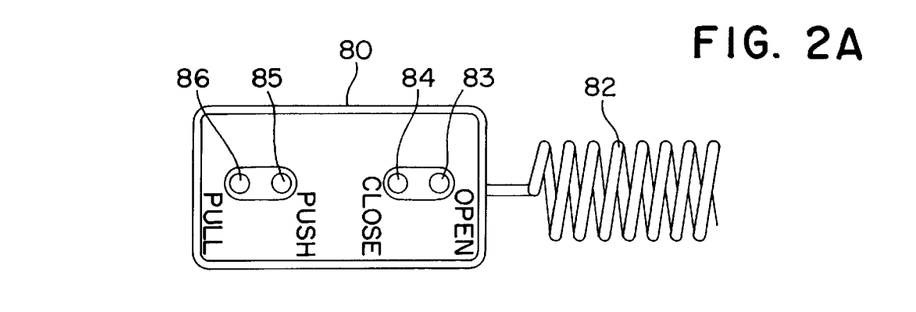
FIG. 2A is an enlarged top plan view of a remote hand control component in accordance with the present invention.

In use, FIGS. 1 and 6 to 8 illustrate the operation of the slip sheet handler attachment 10 in drawing a containerized load K resting on a slip sheet S onto the platen 12, as illustrated in FIGS. 1 and 6. FIGS. 7 and 8 illustrate transportation of the load into alignment with a pallet Y and removal of the load K from the platen 12 onto the pallet Y. More specifically, as shown in FIG. 6, the gripper assembly 14 is advanced by the power transmission drive 18 through a remote hand control represented at 80 which is hard-wired via line 82 which is electrically connected to the linear actuator 46 and to the sprocket drive 65. As illustrated in FIG. 2A, the remote control 80 includes two sets of buttons, one pair of buttons 83 and 84 being "open" and "close" buttons, respectively, to control vertical movement of the pressure pad 26 away from and into engagement with the lower jaw 28. Another set of "push" and "pull" buttons 85 and 86 control the forward and reverse movement of the carriage 15 along the platen 12. The remote hand control as described permits the operator to position himself alongside the apparatus in order to closely view the loading and unloading operations.

The pallet jack J is manually controlled to advance the platen 12 into confronting relation to the load K to be transported. The carriage 15 is then advanced forwardly along the platen 12 by depressing of the button 85 and, as the carriage 15 passes beyond the fulcrum point 22 will cause the platen 12 to automatically tilt downwardly at its leading edge 25 into the attitude shown in FIG. 6. As the gripper assembly 14 passes beyond the leading edge 25, it will be free to slide downwardly into engagement with the floor surface. The lower jaw 28 is then advanced forwardly either by depression of the button 85 or advancement of the pallet jack until the lower jaw 28 slides under the edge of the slip sheet 25. The pressure pad 26 is then driven downwardly by the linear actuator 46 when the operator depresses the Close Button 84 to tightly grip the slip sheet S between the pressure pad 26 and jaw 28. Depression of the pull button 86 will cause the carriage 15 to be retracted by the sprocket drive 65 and draw the load K along with the slip sheet S upwardly onto the platen, as shown in FIG. 1. As the carriage is retracted, the swivel mounts 29 will permit the pressure pad 26 to rotate or pivot slightly in a direction toward the upper crest of the shelf portion 35 thereby increasing the pressure against the slip sheet S and resist any tendency of the slip sheet S to separate from the jaws 26 and 28. Again, when the center of gravity of the carriage 15, load K and sprocket drive 65 advances beyond the fulcrum point 22, the platen 12 will automatically return to its horizontal transport position as shown in FIG. 1 with the platen 12 and tines T resting on the rollers R. As more clearly seen from FIGS. 7 and 8, the standard pallet jack J typically includes linkage arms A for the rollers which will permit the operator to lower the rollers R as the tines T are lifted by the pump P under the control of the lift lever L, for example, in aligning the leading edge of the platen 12 with the pallet Y. The carriage 15 is once again advanced forwardly along the platen with the frame 30 pushing the load K forwardly off of the platen 12 and onto the pallet Y as shown in FIG. 8. The pressure pad 26 is then released by reversing the linear actuator 46 with the open button 83, and the reverse button 86 is depressed to withdraw the lower jaw 28 from beneath the slip sheet S.

From the foregoing, in order to install the attachment 10 onto the jack unit J the pivot pins 20 are removed from the tines T and the tines T passed through the stringers 13 until the openings in the tines T are aligned with those in the stringers 13 for re-insertion of the pivot pins. The process is reversed when it is desired to use the jack for other loading and unloading operations. It will be appreciated that the attachment 10 is readily conformable for use with forklift trucks as well as pallet jacks of the type described and basically can be installed and removed in the same manner as described.

It is therefore to be understood that while a preferred form of invention has been herein set forth and described, various modifications and changes may be made in the construction and arrangement of parts as well as its adaptability for use with different types of lift jack units without departing from the spirit and scope of the present invention as defined by the appended claims and reasonable equivalents thereof.

We claim:

1. Slip sheet handling apparatus for use in combination with a pallet jack having spaced, horizontally extending tines, said apparatus comprising:

a platen having means for mounting said platen on said tines for tiltable movement of said platen about a transverse horizontal axis beneath said platen whereby a forward end of said platen is movable between a raised position and a lowered ground-engaging position;

a gripper assembly mounted for horizontal advancement above said platen between a rearward and the forward end of said platen, said gripper assembly including upper and lower jaws and control means for advancing said jaws between an open position to receive an edge of said slip sheet and a closed, slip sheet-engaging position, wherein advancement of said gripper assembly to the forward end of said platen causes the forward end of said platen to move by gravity to the lowered ground-engaging position; and wherein said jaws includes a lower fixed pick-up flange and a pressure pad spaced above said flange, said flange curving downwardly and forwardly beneath said pressure pad, said apparatus further comprises drive means for advancing said gripper assembly between the rearward end of said platen and a forward position ahead of the forward end of said platen, wherein the width of said flange and said pressure pad is approximately equal to the width of said platen, and said apparatus further comprises means for slidably supporting said flange whereby said flange is free to rest against an upper surface of said platen and to advance downwardly solely by gravity into a ground-engaging position when advanced beyond the forward end of said platen.

2. Slip sheet handling apparatus according to claim 1 wherein said mounting means includes fulcrum support members depending downwardly from said platen and pivot pins between said support members and said tines.

3. Slip sheet handling apparatus according to claim 1 wherein the forward end of said platen extends beyond forward ends of said tines.

4. Slip sheet handling apparatus according to claim 1 wherein tilt control means are provided in association with said mounting means to control tilting movement of said platen.

5. Slip sheet handling apparatus according to claim 1 wherein said flange includes a forwardly curved surface provided with a raised portion engageable with said pressure pad, and said pressure pad including means mounting said pressure pad for limited swiveled movement about a horizontal axis extending parallel to the length of said pressure pad.

6. Slip sheet handling apparatus according to claim 1 wherein said gripper assembly includes a vertical frame upon which said jaws are mounted and pressure equalizing means for balancing the downward pressure of said jaws against said slip sheet.

7. A slip sheet handling attachment for use in combination with a pallet jack having spaced, horizontally extending tines, said attachment comprising:
   a platen including means releasably mounting said platen on said tines and wherein a forward end of said platen is movable between a raised position and a lowered ground-engaging position; and
   a gripper assembly mounted for horizontal advancement above said platen between a rearward and the forward end of said platen, said gripper assembly including upper and lower jaws and control means for advancing said jaws between an open position to receive an edge of said slip sheet and a closed, slip sheet-engaging position, a vertical frame upon which said jaws are mounted, and pressure-equalizing means for balancing the downward pressure of said jaws against said slip sheet; wherein advancement of said gripper assembly to the forward end of said platen causes the forward end of said platen to move solely by gravity to the lowered ground-engaging position and said attachment further comprises means for slidably supporting said gripper assembly for vertical floating movement with respect to said platen whereby said lower jaw is free to rest against an upper surface of said platen and to advance into ground-engaging position when advanced beyond the forward end of said platen.

8. A slip sheet handling attachment according to claim 7 wherein said mounting means includes fulcrum support members depending downwardly from said platen and pivot pins between said support members and said tines for tiltable movement of said platen about a transverse horizontal axis beneath said platen.

9. A slip sheet handling attachment according to claim 7 wherein said jaws include a lower pick-up flange and a pressure pad spaced above said flange, and said attachment further comprises a carriage including drive means for advancing said gripper assembly between the rearward end of said platen and a forward position ahead of the forward end of said platen.

10. A slip sheet handling attachment according to claim 9 wherein said flange curves downwardly and forwardly beneath said pressure pad, said flange being fixed with respect to said pressure pad.

11. A slip sheet handling attachment according to claim 10 wherein the width of said flange and pressure pad is approximately equal to the width of said platen.

12. A slip sheet handling attachment according to claim 11 wherein said flange includes a forwardly curved surface provided with a horizontal shelf portion engageable with said pressure pad, and said pressure pad including means for mounting said pressure pad for limited swiveled movement about a horizontal axis extending parallel to the length of said pressure pad whereby downward movement of said pressure pad into engagement with a slip sheet resting on said flange will automatically increase the gripping pressure of said pressure pad on the slip sheet when said gripper assembly is drawn rearwardly along said platen.

13. A slip sheet handling attachment according to claim 9 wherein said carriage includes a power transmission drive having a chain member extending through a longitudinal slot in said platen.

14. A slip sheet handling attachment according to claim 13, wherein said power transmission drive includes a drive sprocket end at least one idler sprocket mounted on said carriage, said chain member being trained over said drive sprocket and said idler sprocket(s).

15. A slip sheet handling attachment according to claim 13, wherein retainer means are provided beneath said platen to secure said carriage for slidable movement along said platen while resisting any tendency of said carriage to be shifted or tilted with respect to said platen.

16. A slip sheet handling attachment according to claim 7, wherein said control means are movable with said carriage to control advancement of said carriage along said platen and opening and closing movement of said upper and lower jaws.

17. A slip sheet handling attachment for use in combination with a pallet jack having spaced, horizontally extending tines, said attachment comprising:
   a platen having spaced pairs of stringers on its undersurface, each said pair of stringers flanking opposite sides of each of said tines, said stringers having lower edges diverging forwardly and downwardly from a rearward end of said platen into fulcrum portions spaced beneath said tines and said stringers converging forwardly from said fulcrum portion to terminate at a leading edge of said platen, and pivot members for pivotally connecting each of said pair of stringers to one of said tines along a transverse horizontal axis spaced above said fulcrum portions wherein said leading edge of said platen is tiltable about said fulcrum portion independently of said tines between a level position and a lowered ground-engaging position; and
   a gripper assembly including a carriage mounted for horizontal advancement along an upper surface of said platen between the rearward end and the leading edge of said platen, power transmission drive means on said carriage for advancing said gripper assembly between the rearward end and the leading edge of said platen and wherein advancement of said gripper assembly toward the leading edge beyond said fulcrum portions will automatically cause downward tilting of said platen about said pivot members into the ground-engaging position.

18. A slip sheet handling attachment according to claim 17 wherein rearward movement of said gripper assembly from the leading edge past said fulcrum portions automatically causes upward tilting of the leading edge of said platen about said pivot members.

19. A slip sheet handling attachment according to claim 17 wherein said gripper assembly is slidably supported on said carriage for free floating movement in a vertical direction.

* * * * *

UNITED STATES PATENT AND TRADEMARK OFFICE
CERTIFICATE OF CORRECTION

PATENT NO. : 5,769,595
DATED : 23 June, 1998
INVENTOR(S) : Pearce, R. A. et al

It is certified that error appears in the above-identified patent and that said Letters Patent is hereby corrected as shown below:

In the drawings, Sheet 4, the reference letter E should be applied to the end of the slip sheet S as shown below:

FIG. 4

Signed and Sealed this

Twentieth Day of October, 1998

Attest:

BRUCE LEHMAN

Attesting Officer

Commissioner of Patents and Trademarks